Oct. 8, 1935.  L. C. SHIPPY ET AL  2,016,654
FLUID PRESSURE OPERATING MEANS FOR BORING MACHINES
Filed Sept. 29, 1932  7 Sheets-Sheet 3

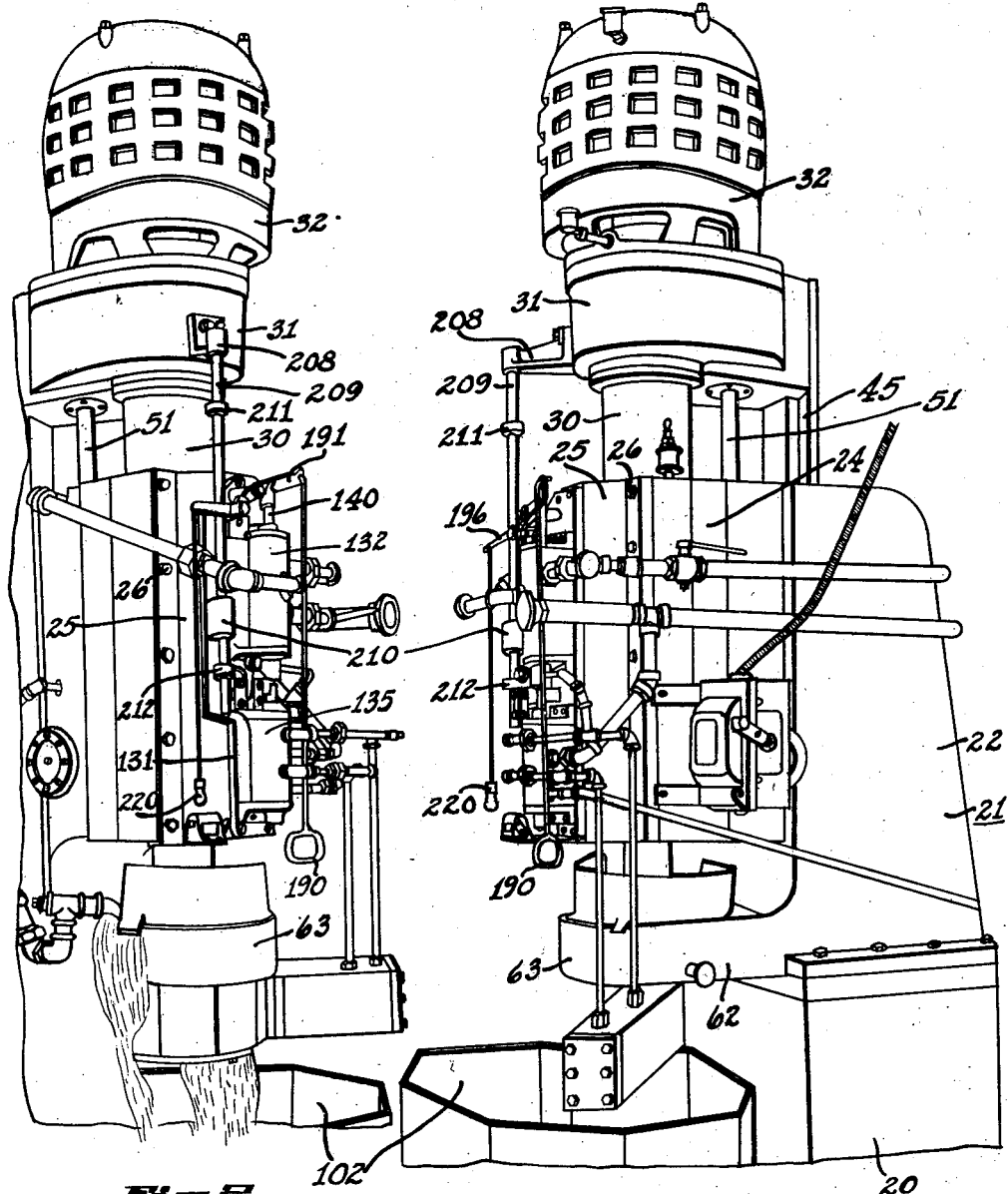

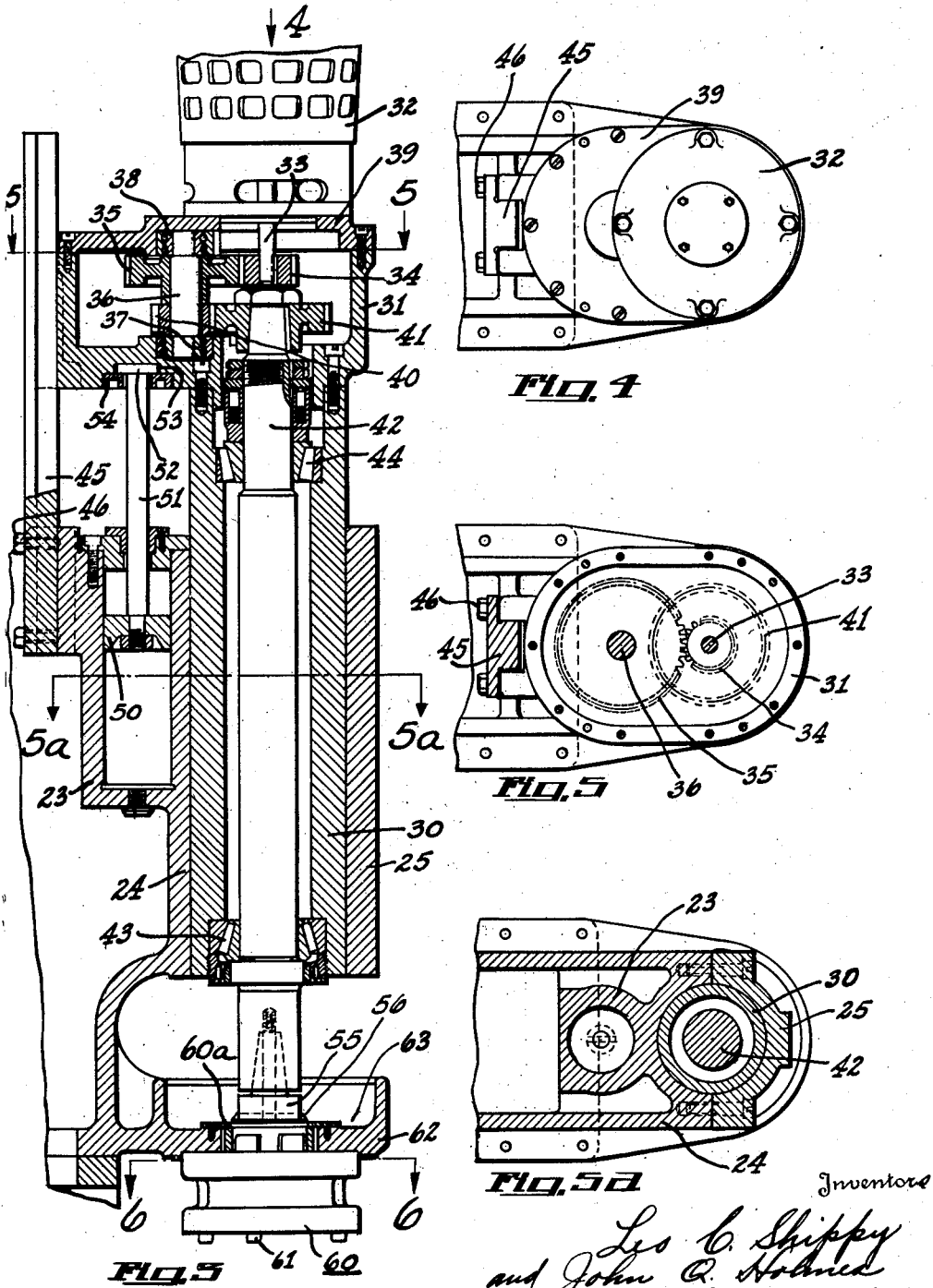

Inventors
Leo C. Shippy
and John Q. Holmes
By Spencer Hardman & Fehr
their Attorneys

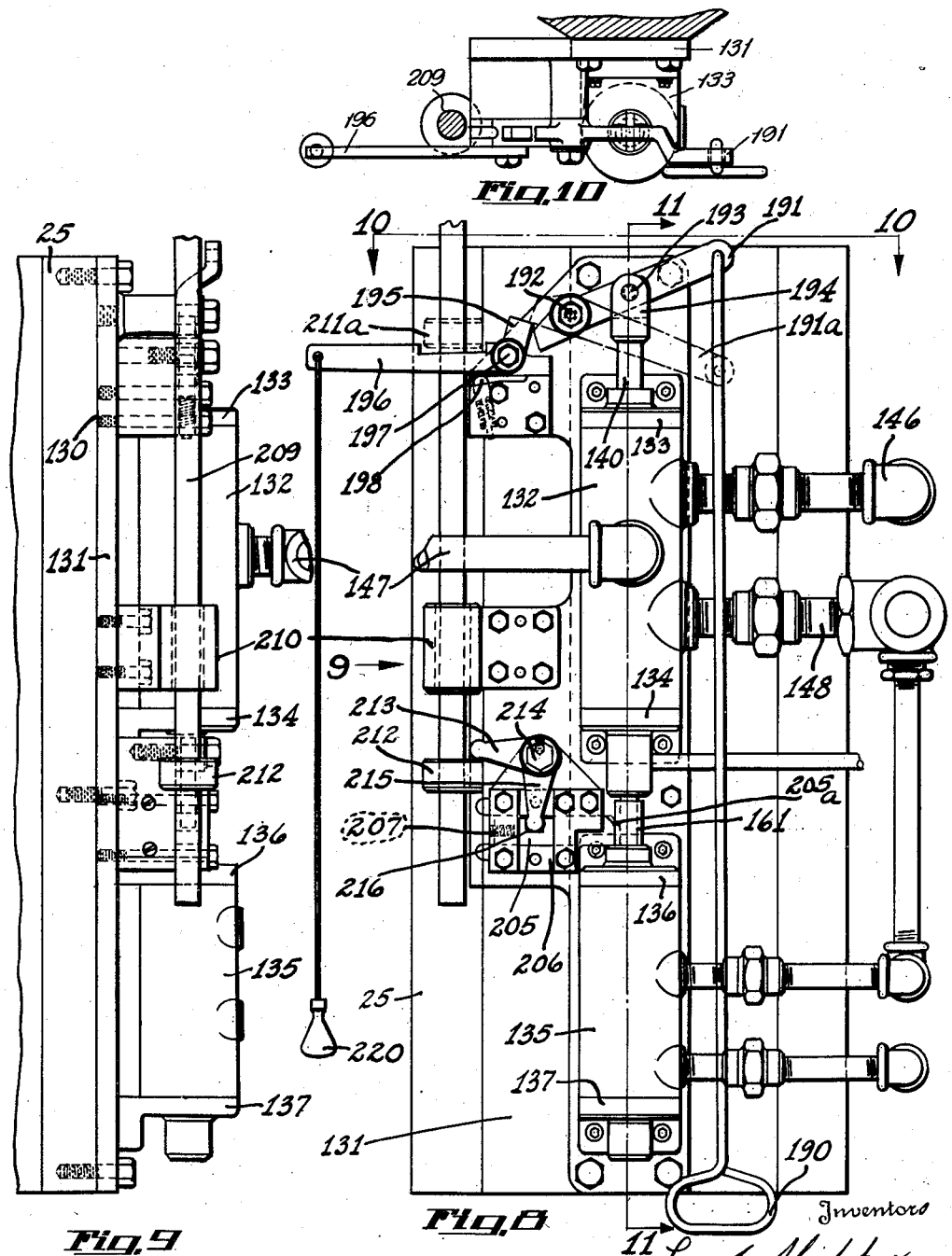

Oct. 8, 1935.  L. C. SHIPPY ET AL  2,016,654
FLUID PRESSURE OPERATING MEANS FOR BORING MACHINES
Filed Sept. 29, 1932  7 Sheets-Sheet 5
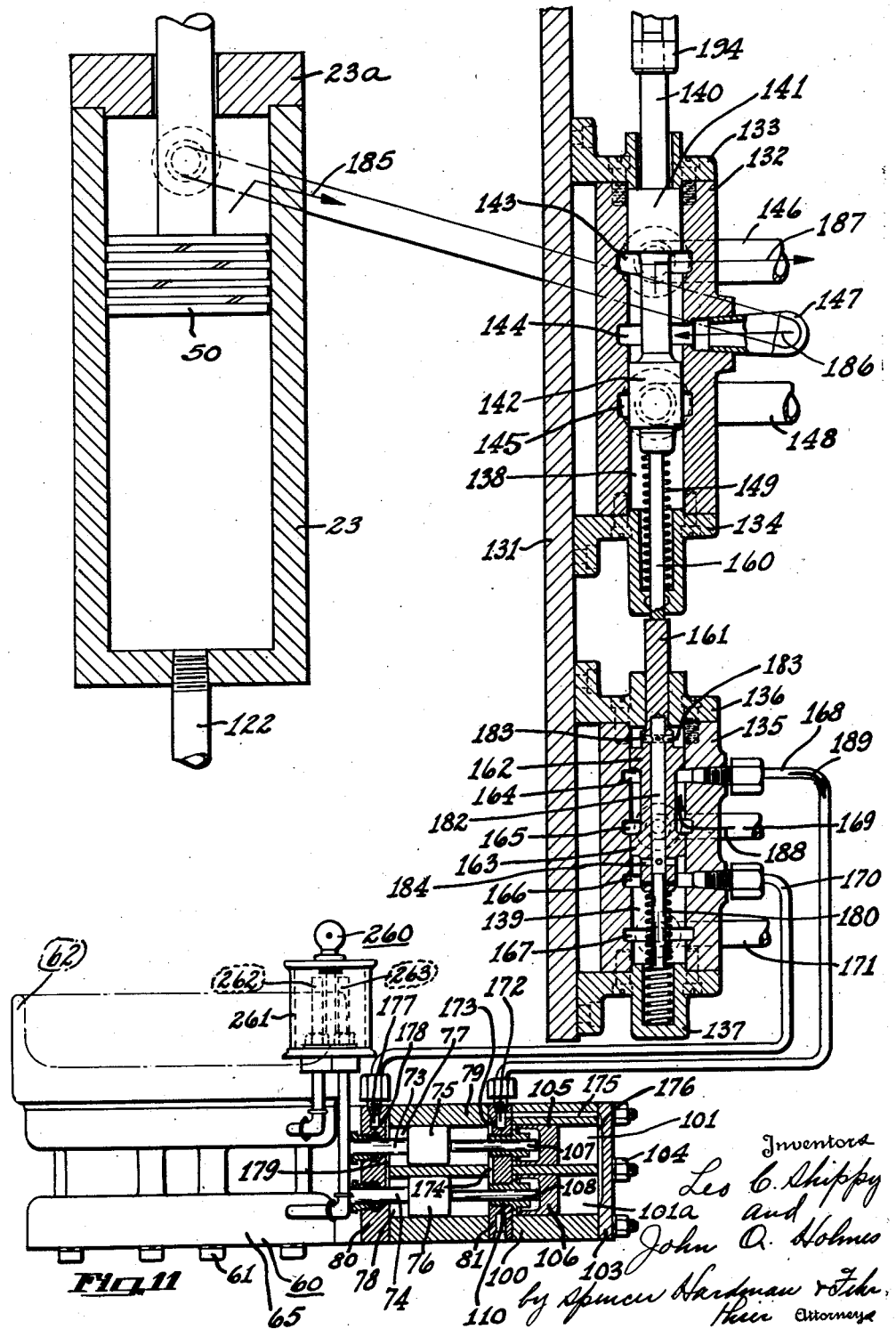

Oct. 8, 1935.  L. C. SHIPPY ET AL  2,016,654
FLUID PRESSURE OPERATING MEANS FOR BORING MACHINES
Filed Sept. 29, 1932  7 Sheets-Sheet 7

Patented Oct. 8, 1935

2,016,654

UNITED STATES PATENT OFFICE 2,016,654

FLUID PRESSURE OPERATING MEANS FOR BORING MACHINES

Leo C. Shippy, Lockport, N. Y., and John Q. Holmes, Anderson, Ind., assignors, by mesne assignments, to General Motors Corporation, Detroit, Mich., a corporation of Delaware Application September 29, 1932, Serial No. 635,316

8 Claims. (Cl. 60—52)

This invention relates to automatic drilling or boring machines and more particularly to a machine for drilling or boring a cylindrical interior surface of a tubular member.

It is among the objects of the present invention to provide a machine of the character described, whose operating tool is bodily moved in both directions by fluid pressure, and more particularly in such manner that it slowly advances toward a workpiece and rapidly retracts therefrom in response to a single manipulation of a control member by the operator of the machine.

Another object of the present invention is to provide means for varying the rate of reciprocatory movement of the operating tool.

Further objects and advantages of the present invention will be apparent from the following description, reference being had to the accompanying drawings wherein a preferred embodiment of one form of the present invention is clearly shown.

In the drawings:

Fig. 2 is a perspective view showing portions of the left hand side and front of the machine.

Fig. 3 is a fragmentary side elevation partly in vertical longitudinal section.

Fig. 4 is a plan view of the machine looking in the direction of arrow 4 in Fig. 3.

Fig. 5 is an enlarged sectional view taken on the line 5—5 of Fig. 3.

Fig. 5a is a sectional view taken on the line 5a—5a of Fig. 3.

Fig. 6 is partly in section taken on the line 6a—6a of Fig. 12.

Fig. 8 is a front elevation of the control apparatus for the machine.

Fig. 9 is a side elevation thereof looking in the direction of arrow 9 in Fig. 8.

Fig. 10 is a plan view of the apparatus partly in section taken on the line 10—10 of Fig. 8.

Fig. 11 is a longitudinal sectional view taken on the line 11—11 of Fig. 8, and 11a—11a of Fig. 6, and shows the control apparatus in position for returning the boring machine to normal position, and for releasing the work from the chuck.

Fig. 12 is a view similar to Fig. 11 showing the control apparatus in position for causing the chuck to grip the work and the boring machine to operate upon the same.

Fig. 13 is a diagrammatic view of a fluid pressure system controlled by the control apparatus and bringing about the movement of the boring spindle and operation of the chuck.

Figure 6:
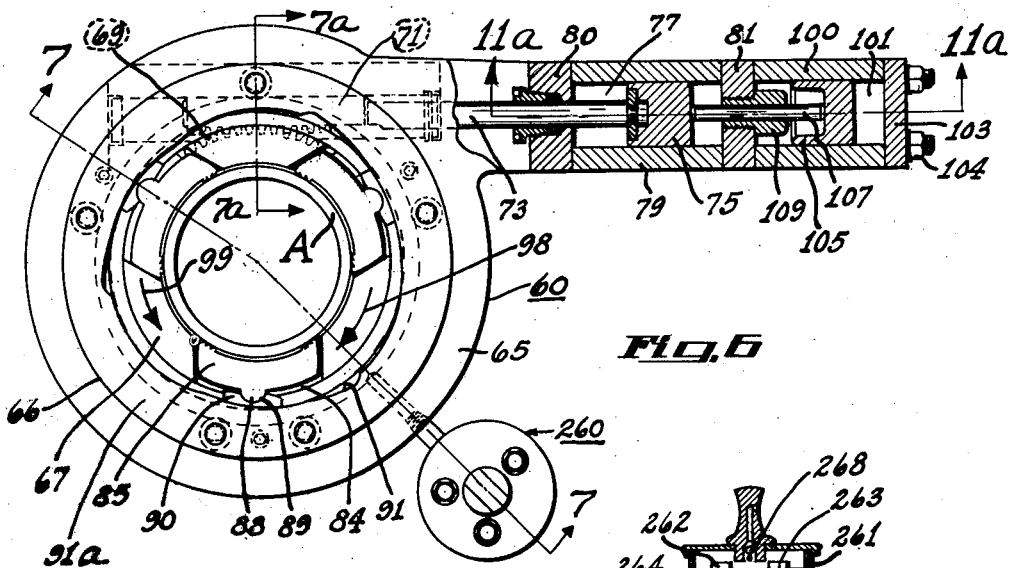
Fig. 6 is a plan view of the workholder or chuck taken on the line 6—6 of Fig. 3.

Referring to the drawings the boring machine 10 comprises a base 20 which supports a frame 21, having spaced brackets 22 which cooperate to support an integral cylinder 23 and an integral bearing member 24 to which a detachable bearing member 25 is secured by screws 26. The bearing members 24 and 25 cooperate laterally to support and guide a spindle frame 30 of cylindrical shape which supports at its upper end a gear box 31 upon the upper side of which an electric motor 32 is mounted in any suitable manner. Motor 32 drives a shaft 33 (see Fig. 3) carrying a gear 34 which meshes with a gear 35, attached to a shaft 36, journaled in bearings 37 and 38, provided by the gear-box 31 and a gear-box cover 39 respectively, the latter of which provides a supporting base for motor 32. Shaft 36 drives a gear 40, meshing with a gear 41, attached to the upper end of a boring shaft or spindle 42, journaled in tapered roller bearings 43 and 44 which are secured to the spindle frame 30 in proper manner as clearly shown in Fig. 3. It follows from the foregoing that the boring spindle 42 is longitudinally immovable with respect to the spindle frame 30, which itself is movable longitudinally within the bearing members 24 and 25. In order to prevent rotation of the spindle frame relative to the bearing members, a guide plate 45 of suitable shape, which is secured by screws 46 to the frame 21 is received by correspondingly shaped guide portions provided by the gear box 31 which is fast with the spindle frame.

The spindle frame 30 is caused to descend or ascend under the action of suitable fluid under pressure in cylinder 23 such as oil for instance. This fluid actuates a piston 50 in said cylinder which transmits its movement through a connecting rod 51 to the gear box 31. Connecting rod 51 is provided with a flathead 52, received in a recess 53 of the gearbox and retained therein by a nut 54.

The boring spindle 42 carries at its lower end a boring bit-head 55 carrying one or more bits 56 for machining the interior of a workpiece A, clamped in a chuck 60, to be described, which is attached by screws 61 to a bracket 62 integral with the frame 21 which bracket provides a splash pan 63 for receiving liquid (such as water) used to cool the work and boring bits.

Figure 7:
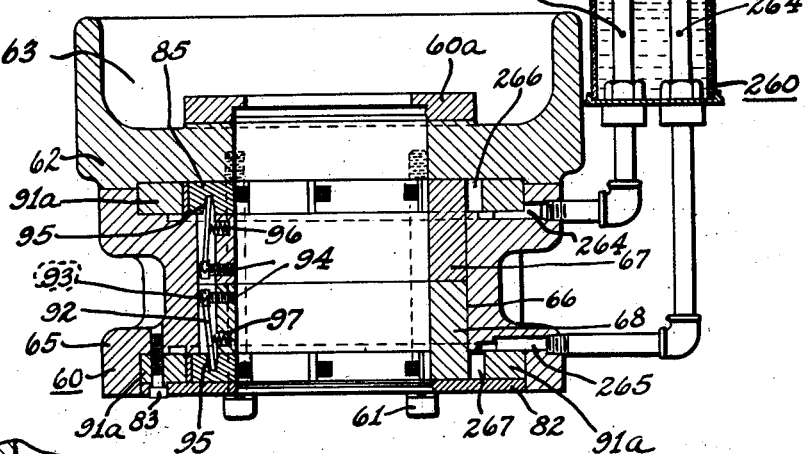
Fig. 7 is a sectional view taken on the line 7—7 of Fig. 6.
Figure 7A:
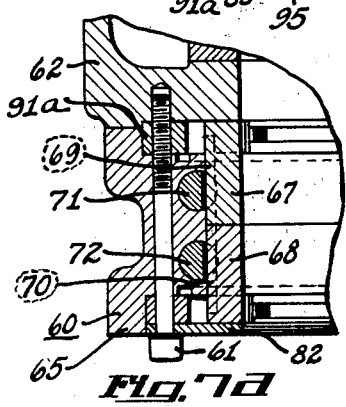
Fig. 7a is a sectional view taken on the line 7a—7a of Fig. 6.

The chuck 60 which is shown in detail in Figs. 6, 7 and 7a comprises a frame 65, having a cylindrical bore 66 which receives chuck jaw frames 67 and 68, having cylindrical peripheries in which gear segments 69 and 70, respectively, are cut. Segments 69 and 70 mesh with racks 71 and 72, respectively, attached by rods 73 and 74, respectively, to pistons 75 and 76, respectively, (see Figs. 11 and 12) which are slidable in cylinders 77 and 78, respectively, provided by a cylinder block 79, clamped between end plates 80 and 81 which are bolted to the chuck frame 65. Chuck jaw frame 67 is confined between the jaw frame 68 and the bracket 62. Chuck jaw frame 68 is confined between the jaw frame 67 and a bottom plate 82, secured by screws 83 to the frame 65. Each of the jaw frames 67, 68 is provided with radial notches 84 each of which guides for radial movement a chuck jaw 85 having teeth for gripping the workpiece A. A part roller shaped portion 88 of each chuck jaw 85 is received by the socket portion 89 of glide shoe 90, which is adapted to engage with a stationary camming surface 91 provided by cam rings 91a located in the frame 65. The glide shoes 90 are normally urged against the camming surfaces 91 by levers 92, pivotally received as at 93 in the heads of screws 94, threaded into the chuck jaw frames 67 and 68, the free ends of the levers 92 being received in notches 95 provided by the chuck jaws 85. Springs 96 which are seated in annular recesses 97 of the chuck jaw frames urge the levers 92 and therewith the chuck jaws 85 in such direction that the glide shoes 90 are maintained in engagement with the camming surfaces 91. When the pistons 75 and 76 move toward the right as viewed in Figs. 6, 11 and 12, the frames 67 and 68 will rotate in the direction of the arrow 98, thereby causing the glide shoes 90 to ride progressively toward those portions of the camming surfaces 91 which approach the center of the chuck, thereby causing the workpiece A to be firmly gripped by the jaws 85. When the pistons 75 and 76 move toward the left as viewed in Fig. 11, the motion of the chuck frames 67 and 68 will take place in the direction of the arrow 99, thereby causing the glide members 90 to ride progressively toward portions of the camming surfaces 91 which remove from the center of the chuck, whereupon the jaws will recede from the workpiece A and permit the latter to descend by gravity into a container 102 shown in Figs. 1 and 2.

As the frictional resistance encountered between the glide members 90 of the chuck jaws 85 and the camming surfaces 91 is a sliding friction the coefficient of which is less than the coefficient of the static friction to be overcome first before the chuck jaw frames 67 and 68 can be started rotating in a counterclockwise direction as viewed in Fig. 6 to effect release of a clamped workpiece, another cylinder block 100 is provided (see Figs. 11 and 12) comprising two cylinders 101 and 101a in axial alignment with cylinders 77 and 78, respectively, which receive pistons 105 and 106 respectively, adapted to aid pistons 75, 76 in their movement toward the left. Cylinder block 100 is clamped between end plates 81 and 103 all of which are bolted together as at 104. The pistons 105 and 106 are engaged by rods 107 and 108 respectively, passing through stuffing boxes 109 and 110 respectively, which are threaded into end wall 81. When fluid pressure is admitted to the cylinders 77 and 78 to move the pistons therein toward the left as viewed in Fig. 11, the same fluid pressure will also be permitted to enter cylinders 101 and 101a thereby forcing the pistons therein toward the left which movement of the pistons 105 and 106 is transmitted through the rods 107 and 108 to the pistons 75 and 76 thereby aiding the latter pistons in their movement which results in unclamping of the workpiece A. The manner in which the right sides of cylinders 77, 78 and 101, 101a communicate with the same fluid pressure in order to move the pistons in all these cylinders toward the left will be described later.

With particular reference to Fig. 7 an oiler 260 is shown which is adapted to lubricate the sliding surfaces of the chuck jaws 85, the chuck jaw frames 67 and 68 and the cam rings 91a in order to prevent rusting of these surfaces under the influence of the cooling water running past these surfaces from the splash pan 63. Extending into the oiler housing 261 are two tubes 262 and 263 which are closed on top and have an opening 264 in their cylindrical wall. These tubes 262 and 263 extend outside of the housing 261 and are threaded into ducts 264 and 265, respectively, in the bracket 65, which ducts are in communication with annular chambers 266 and 267. Chamber 266 is formed by the camming surfaces 91 of the cam rings 91a, the external surface of chuck jaw frame 67, the bottom surface of bracket 62 and the top surface of bracket 65, while chamber 267 is formed by the camming surfaces 91 of cam rings 91a, the external surface of chuck jaw frame 68, the plate 82 and the bottom surface of bracket 65. The oil level in housing 261 is supposed to be above the openings 264 in the tubes 262 and 263. During radial movements of all chuck jaws 85 toward the center of the chuck the oil containing chambers 266 and 267 are enlarged as can well be understood, and oil from the oiler will fill up the enlarged chambers. During the discharge of oil from the oiler, air is permitted to enter the oiler through a check valve 268 on top of said oiler. During radial movement of the chuck jaws 85 away from the center of the chuck, the oil in the chambers 266 and 267 and in the oiler 260 is slightly compressed due to the fact that the air overlying the oil supply in oiler 260 cannot escape through check valve 268 and is therefore slightly compressed. Some of the oil under pressure in the chambers 266 and 267 will therefore escape between the sliding surfaces of the chuck jaws 85 and corresponding chuck jaw frames 67 and 68 with every retracting radial stroke of the chuck jaws. The cooling water has no access to the sliding surfaces of the chuck jaws and chuck jaw frames because there is a substantially permanent coat of oil between these sliding surfaces. More important for a smooth operation of the chuck is the fact that the camming surfaces 91 are always in bodily contact with the oil in chambers 266 and 267 which oil appreciably reduces the considerable static friction between glide shoes 90 and camming surfaces 91, which is to be overcome first when unclamping a workpiece.

Figure 14:
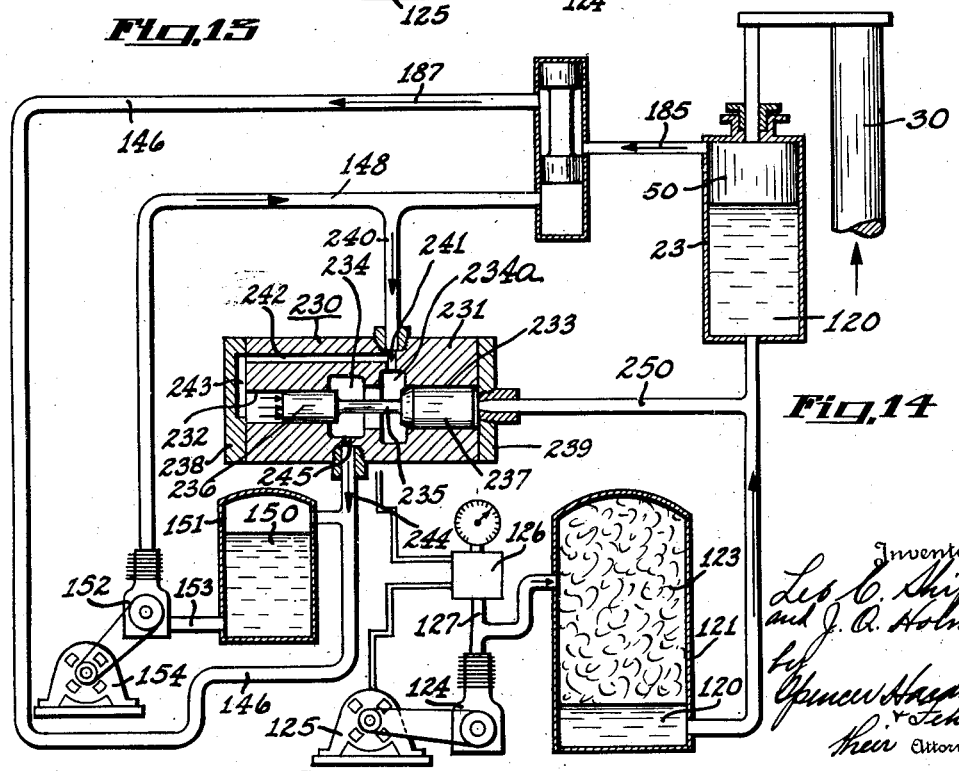
Fig. 14 is a diagrammatic view similar to Fig. 13 showing however mechanical parts of the fluid pressure system in a different position.

The lower side of the piston 50 in cylinder 23 is permanently subjected to a fluid, preferably oil because of its sealing quality, which is under substantially constant pressure. As best shown in Figs. 13 and 14 an oil supply 120 contained in a tank 121 communicates through a pipe 122 with the lower side of cylinder 23. Compressed air 123 maintains the oil in the tank under pressure. An air compressor 124 of any suitable type forces compressed air into the tank 121, said compressor being driven by an electric motor 125. As the pressure of the oil in tank 121 and the lower side of cylinder 23 should not exceed a certain value for reasons which will appear obvious later, any conventional pressure responsive instrumentality 126 has been provided which is electrically connected with the motor circuit and opens the same when the compression of the air in tank 121 exceeds a desired value. The instrumentality 126 is in communication with the compressed air in tank 121 by a pipe 127. It may be stated in advance that the pressure of the oil 120 which operates to lift the spindle frame 30 is less than the pressure of the fluid which is adapted to effect descent of the same.

The control of the admission of pressure fluid to the upper chamber of cylinder 23, and to the chuck operating cylinders 77, 78 and 101, 101a will now be described with reference to Figs. 8 to 14 inclusive. To the front face 130 of the spindle frame guide member 25 is secured a plate 131 which supports a valve body 132 to which end members 133 and 134 are secured, said end members providing brackets by which the body 132 is attached to the plate 131. The plate 131 supports another valve body 135 having end members 136 and 137 by which said valve body is attached to plate 131. Valve body 132 is provided with a central bore 138 and valve body 135 with a similar bore 139 which is in axial alignment with the bore 138. Valve body 132 receives a valve rod 140, providing cylindrical valves 141 and 142 for controlling ports 143, 144 and 145, communicating with pipes 146, 147 and 148 respectively. A spring 149 tends to maintain the valve rod 140 in upper position shown in Fig. 11. The pipe 147 also communicates with the cylinder 23 between the piston 50 and a cylinder head 23a. Pipe 146 returns the pressure fluid to a fluid supply 150 which is preferably oil contained in a tank 151 as best shown in Fig. 13. Pipe 148 is connected with the high pressure side of a compression pump 152 whose lower pressure side communicates with the oil supply in tank 151 through a pipe 153. Compression pump 152 is driven by an electric motor 154.

The spring 149 which lifts the valve 141 surrounds a rod 160, attached to the valve 142 and adapted to transmit downward movement from said valve to a valve rod 161 which slides through valve body 135 and has cylindrical valves 162 and 163 for controlling ports 164, 165, 166 and 167 communicating respectively, with pipes 168, 169, 170 and 171. Pipe 168 communicates with a duct 172 in end plate 81 which is in communication with the right sides of cylinders 77, 78 and 101, 101a as viewed in Fig. 11 by a duct 173 and a groove 174, both in end plate 81 and a duct 175 and a groove 176, respectively, provided by the cylinder block 100 and end plate 103, respectively. Pipe 169 is connected with a source of fluid, preferably oil under pressure. Pipe 170 communicates with a duct 177 in end plate 80 which in turn is communicating with the left sides of cylinders 77 and 78 by a duct 178 and a groove 179 in said end plate. Pipe 171 leads back to a reservoir containing oil under low pressure or to the low pressure side of a compression pump (neither one shown). In the first case a compressor (not shown) forces oil under pressure from the reservoir into pipe 169, while in the second case the compression pump performs the same operation. Valve rod 161 is normally maintained in elevated position shown in Fig. 11, by a spring 180, surrounding a rod 181, attached to the valve rod 161. The valve rod 161 is provided with a central passage 182 communicating with the side passages 183 and 184. When the valve 161 moves upwardly these passages provide for the transfer of oil from that portion of the valve body 135 which is above the valve 162 to that portion of the valve body 135 which is below the valve 163, and vice versa, when valve rod 161 moves downwardly.

Normally the valve rods 140 and 161 are in upper position as shown in Figs. 8, 9 and 11. When the valve rods are in this position the upper end of the cylinder 23 is connected with the drain 146 as indicated by arrows 185, 186 and 187. Likewise the righthand sides of the cylinders 77, 78 and 101, 101a are connected with the high pressure supply pipe 169 as indicated by arrows 188 and 189, whereupon the pistons 75, 76 and 105, 106 move toward the left as viewed in Fig. 11, thereby causing the chuck jaws to be located in non-clamping position. To use the machine, the operator will pass the workpiece A upwardly through the central opening in the chuck 60 until the workpiece strikes a stop plate 60a which is attached to the bracket 62 as shown in Fig. 7. While maintaining the workpiece A in this position with one hand, the operator pulls down on a handle 190 (see Fig. 8), thereby causing a lever 191, pivoted at 192 upon the plate 131, to move into the position 191a, indicated in dot and dash lines. The lever 191 being connected by a pin 193 to a bifurcated block 194, attached to the valve rod 140, will cause the valve rods 140 and 161 to move from the positions shown in Fig. 11 to those shown in Fig. 12. These valve rods will be held in these positions by a latch 195, attached to a lever 196 which is pivoted at 197 upon the plate 131, and urged by a spring pressed plunger 198 in a clockwise direction as viewed in Fig. 8, so that the latch 195 will engage the under side of the lever 191 to hold it in the position 191a. Movement of the valve rod 140 into the position shown in Fig. 12 will cause the upper side of the cylinder 23 to be connected with the high pressure pipe 148 as indicated by arrows 199, 200 and 201. The movement of the valve rod 161 into the position shown in Fig. 12 will cause the high pressure pipe 169 to be connected with the left hand side of the cylinders 77 and 78 as indicated by arrows 202 and 203, in order to cause the pistons 75 and 76 to move toward the right as viewed in Fig. 12, thereby also moving pistons 105 and 106 toward the right. Consequently, the workpiece A will be clamped in the chuck while the spindle frame 30 descends due to the force exerted upon the upper side of the piston 50 as indicated by arrows 204. As the spindle frame descends, the rotating spindle 42 will cause the boring bits 56 to machine a cylindrical surface upon the interior of the clamped workpiece A.

After the bits 56 have descended below the workpiece A, the spindle frame 30 will be caused to ascend automatically, but the chuck 60 is not automatically released until after the boring bits 56 have ascended above the workpiece.

Figure 1E:
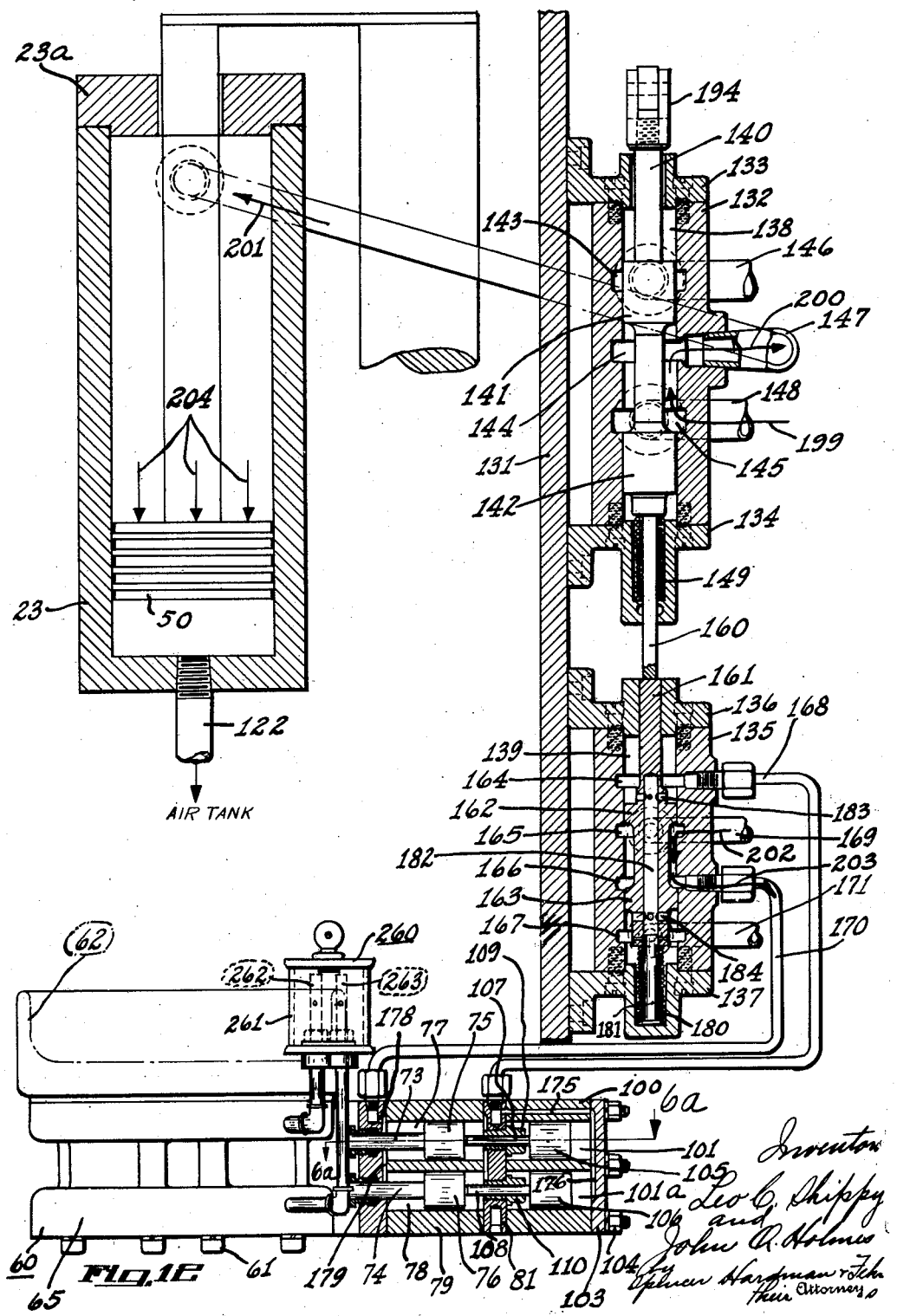
Fig. 1 is a perspective view showing portions of the right side and front elevations of the machine embodying the present invention.
Figure 15:
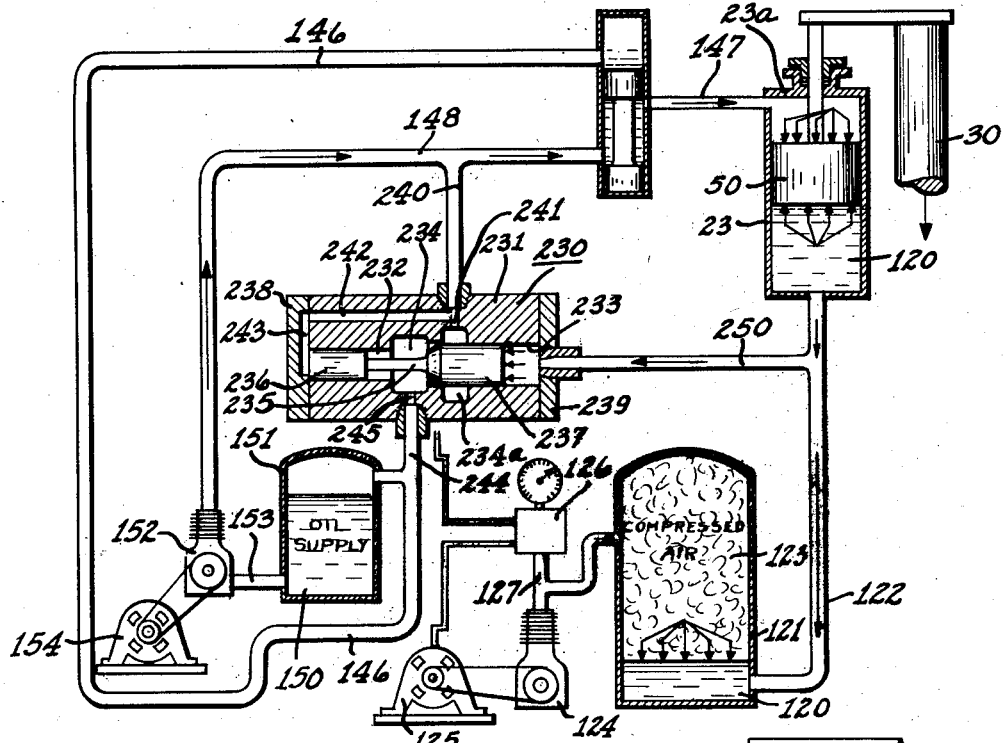

Referring to Figs. 8 and 9 it will be noted that a latch bar 205 slidable in a bracket 206, is urged by a spring 207 toward the right against the valve rod 161. When the valve rod 161 is moved into the position shown in Fig. 12 by the downward movement of valve rod 140, the latch bar 205 will move into the position 205a indicated by dot and dash lines in Fig. 8, so that the same will be located above the upper end of the valve rod 161. As best shown in Figs. 1 and 2 the gear housing 31 carries a bracket 208 from which a rod 209 is suspended, said rod being guided by a bracket 210 which is attached to the plate 131. The rod 209 carries collars 211 and 212 which are adjustably secured thereto. By the time the boring bits 56 have descended below the workpiece A the collar 211 will have descended slightly below the position 211a shown in Fig. 8, in order to engage the latch lever 196 and to cause it to move counter-clockwise as viewed in Fig. 8 in order to move latch 195 from underneath lever 191 whereupon the spring 149 in valve body 132 will cause valve rod 140 to move upwardly, carrying with it lever 191 which moves from position 191a into the normal position shown in full lines in Fig. 8. The return of the valve rod 140 to normal up position will allow the fluid pressure to flow from the cylinder 23 to the fluid supply in tank 151 in the manner indicated by arrows 185, 186 and 187 in Figs. 11 and 14. The lower surface of the piston 50 is continuously under substantially uniform fluid pressure and as soon as the valve rod 140 provides communication between the upper part of the cylinder 23 and the drain pipe 146, piston 59 and therewith the spindle frame 30 will ascend as can be readily understood. By the time the boring bits 56 have arrived above the clamped workpiece A, the collar 212 will have engaged a bell-crank lever 213, pivoted at 214 upon the bracket 206, and move the same clockwise as viewed in Fig. 8, thereby causing its lever arm 215 which is received by a notch 216 in the latch bar 205 to move the latter toward the left as viewed in Fig. 8 so that it will clear the upper end of the valve rod 161, whereupon the spring 180 in valve body 135 will be permitted to return valve rod 161 into the position shown in Fig. 11. When this occurs the pistons 75, 76 and 105, 106 will move from the position shown in Fig. 12 to that shown in Fig. 11, thereby retracting the chuck jaws from the workpiece and permitting the same to descend by gravity into the receptacle 102.

If for any reason it is desired to stop downward movement of the boring spindle while in operation, the operator may pull a handle 220 downwardly (see Fig. 8) to cause the lever 196 to move into a position for releasing the lever 191, whereupon the spindle carrying frame 30 will ascend and the workpiece will be automatically released from the chuck as can be readily understood from the foregoing.

Referring now more particularly to Figs. 13 and 14, the pump 152 is continuously driven by the motor 154. As earlier explained, the fluid delivered from the compression pump 152 serves only one side of piston 50 to effect descent of the same, and in order to prevent an undue increase of the pressure of the fluid delivered from the compression pump 152 or a stalling of the motor driven pump 152 when the piston 50 ascends, a pressure relief instrumentality in form of a fluid regulating valve 230 has been provided for automatically by-passing the fluid in pipe 148 when under excessive pressure to the low pressure supply in tank 151. The reason for providing the fluid regulating valve 230 instead of a pressure responsive switch for stopping and restarting the motor 154 in response to predetermined pressures of the fluid in pipe 148 resides in the fact that the applied former brings about more desirable results than the latter. The continuously flowing fluid under pressure in pipe 148 immediately causes piston 50 to descend upon change of the course of said fluid into the cylinder 23, while in the case of intermittent stops of pump 152 the pressure of the fluid in pipe 148 would rapidly sink due to uncontrollable leaks in the valves, etc., and the descent of the piston 50 would be appreciably delayed. Furthermore it would work hardship on the motor 154 and the pump 152 if the same were repeatedly started under a substantial load. The relief valve 230 comprises a valve body or housing 231 providing axially aligned bores 232 and 233 of different diameter, and ports 234 and 234a. Slidable within the bores 232 and 233 is a valve rod 235 which provides cylindrical valves 236 and 237 slidable within the bores 232 and 233 respectively. Valve body 231 is provided with end plates 238 and 239. A branch pipe 240 of the high pressure pipe 148 communicates with a duct 241, provided by valve body 231, which in turn communicates with bore 232 through a duct 242 in the valve body and a groove 243, provided in end plate 238. Duct 241 also communicates with bore 234a. A branch pipe 244 of drain pipe 146 which is in communication with tank 151, communicates with port 234 through a duct 245 of valve body 231. In the position of the valves 236 and 237 shown in Fig. 13, piston 50 and therewith the spindle frame 30 is descending, the control apparatus is therefore in such position that the fluid in high pressure pipe 148 is free to pass to the upper side of piston 50. This fluid which is under substantially uniform pressure during the descent of piston 50 is transmitted through branch pipe 240, ducts 241, 242 and groove 243 to the left end surface of valve 236. The fluid pressure 120 is transmitted through a branch pipe 250 of pipe 122 to the right end surface of valve 237. It will be assumed for the sake of brevity that the pressure of the liquid 120 is substantially uniform in spite of the further compression of the already compressed air in tank 121 by the fluid which is pushed from the lower side of cylinder 23 into the tank 121 by the descending piston 50. During the descent of piston 50 it is desirable that no fluid in high pressure pipe 148 by-pass through the relief valve 230 to the liquid supply in tank 151, the full charge of the compression pump 152 being necessary to serve the upper side of the piston 50 during such descent. To accomplish this desirable result the diameters of the valves 236 and 237 have been selected in conformity with the well known law that in order to keep a valve in balance the effective areas have to be inversely proportional to the opposing pressures. It may be assumed that the fluid 120 which urges valve rod 235 toward the left be substantially 100 pounds per square inch, and the pressure of the fluid in pipe 148 should not exceed 180 pounds per sq. in., it is then obvious from the foregoing that in order to keep the valve rod 235 in balance, the cross-sectional area of valve 236 has to be 10/18 or 5/9 of the cross-sectional area of the valve 237. As it is, however, desired that the valve rod 235 maintain the position shown in Fig. 13 it is necessary slightly to unbalance the valve rod by making the diameter of valve 237 slightly larger as can be readily understood. As soon as the control apparatus is automatically shifted in such position that communication between the high pressure pipe 148 and cylinder 23 is interrupted, the continuously driven compression pump 152 causes the pressure of the fluid in pipe 148 to increase, which increased pressure is also transmitted to the left end surface of valve 236 whereupon valve rod 235 is shifted from the position shown in Fig. 13 to that shown in Fig. 14 due to the fact that the pressure transmitted to the right end surface of valve 237 does not change. In the position of the valve rod 235 shown in Fig. 14, valve 237 provides communication between the high pressure pipe 148 and the drain pipe 146 through branch pipe 240, duct 241, port 234a, bore 233, port 234, duct 245 and branch pipe 244. In this manner the pressure of the fluid in high pressure pipe 148 never appreciably exceeds a predetermined pressure and no intermittent stopping and restarting of motor 154 which drives pump 152 is necessary. As will be noticed from Figs. 13 and 14, the left end of valve 237 is slightly tapered so that the fluid in pipe 148 does not suddenly communicate or be suddenly intercepted from communication with tank 151 thereby preventing undue strain to the pump due to otherwise occurring sudden changes in the pressure of the fluid in pipe 148. The advantage of having one side of piston 50 permanently exposed to fluid pressure resides in the fact that the piston 50 when exposed to the fluid pressure in the upper side of cylinder 23 slowly descends due to the permanent, counteracting fluid pressure 120 in the lower side of piston 50, and quickly ascends under the action of the same fluid pressure 120 as soon as the control apparatus is shifted in such position that the fluid in the upper side of cylinder 23 is allowed to flow back to supply tank 151. The last mentioned fluid when communicating with supply tank 151 offers hardly any resistance to the ascending piston 50. In this manner a slow workstroke of the boring frame 30 and a quick return stroke of the same has been accomplished with one control apparatus which controls the admission of fluid pressure to one side of cylinder 50 only.

The fluid pressure responsive relief valve 230 not only eliminates intermittent stopping or starting of motor 154 but furthermore constitutes in combination with instrumentality 126, a means for adjusting the boring frame 30 to any desirable rate of reciprocatory movement. Suppose the instrumentality 126 were adjusted to $P_2=140$ lbs. per sq. in., the pressure of the fluid 120 against the lower surface of piston 50 would then also be 140 lbs. per sq. in. and it follows from the foregoing that the piston and therewith the boring frame 30 would ascend quicker than before when a pressure of only 100 lbs. per sq. in. was applied. The rate of movement of the piston 50 downwardly would also be increased as emphasized by the following consideration. The valves 236 and 237 of the fluid relief valve 230 cause the maximum pressure of the fluid in high pressure pipe 148 to be increased to such an extent that the increased pressure $P_1$ of the fluid would be in the same proportion to the pressure $P_2$ as were the maximum pressures of the fluids before the increase in pressure. Using the earlier assumed values of the fluid pressures it follows that:

$$\frac{\text{Orig. pressure of fluid } 120 = 100 \text{ lbs. per sq. in.}}{\text{Orig. max. pressure in pipe } 148 = 180 \text{ lbs. per sq. in.}} =$$
$$\frac{\text{increased pressure of fluid } 120 P_2 = 140 \text{ lbs.}}{\text{increased max. pressure in pipe } 148 = P_1}$$

therefore $P_1 = \frac{180 \times 140}{100} = 252$ lbs. per sq. in.

Before the increase of the pressure of fluid 120, the maximum pressure causing piston 50 to descend was $(180-100)=80$ lbs. per sq. in. less the resistance offered by the work to the tool. After the increase of the pressure of fluid 120 that maximum pressure, is $(P_1-P_2)$ or $(252-140)=112$ lbs. per sq. in. less the resistance offered by the work to the tool. Therefore, after the increase of the pressure of fluid 120 from 100 lbs. per sq. in. to 140 lbs. per sq. in., the pressure causing the piston to ascend was increased 40 lbs. per sq. in. and the maximum pressure causing the piston to descend (not considering for simplicity's sake the resistance offered by the work to the tool) was increased from 80 lbs. per sq. in. to 112 lbs. per sq. in., i. e. 32 lbs. per sq. in. Since the frictional resistance offered by the cylinder wall to the piston 50 is substantially uniform, it follows that an increase of pressure of the fluid 120 not only results in a quicker ascent of said piston but also in a substantially proportional quicker descent of the same if the resistance offered by the work to the tool remains substantially the same. By selecting another ratio between the pressures of the fluids, a change of the rate of ascending movement of piston 50 will result in a more or less proportional change of the rate of descending movement of piston 50.

While the form of embodiment of the present invention as herein disclosed, constitutes a preferred form, it is to be understood that other forms might be adopted, all coming within the scope of the claims which follow.

What is claimed is as follows:

1. In combination with a fluid pressure operated motor, means continuously delivering a first fluid under pressure adapted to operate the motor in one direction; means maintaining a second fluid under substantially constant and less pressure than the first fluid, said second fluid permanently tending to operate the motor in the opposite direction; means for admitting the first fluid to and intercepting the same from the motor; and an instrumentality including a single valve subjected to the pressures of both fluids and responsive to a preassigned pressure ratio between both fluids for by-passing the first fluid past the motor.

2. In combination with a fluid pressure operated motor, means continuously delivering a first fluid under pressure adapted to operate the motor in one direction; means maintaining a second fluid under substantially constant and less pressure than the first fluid, said second fluid permanently tending to operate the motor in the opposite direction; means for admitting the first fluid to and intercepting the same from the motor; and an instrumentality including a single valve subjected to the pressures of both fluids and responsive to a preassigned pressure ratio between both fluids for by-passing the first fluid past the motor and responsive to another preassigned pressure ratio between both fluids for interrupting such by-passing.

3. In combination with a fluid pressure operated motor, means continuously delivering a first fluid under pressure adapted to operate the motor in one direction; means maintaining a second fluid under substantially constant and less pressure than the first fluid, said second fluid permanently tending to operate the motor in the opposite direction; means for admitting the first fluid to and intercepting the same from the motor; and an instrumentality by-passing the first fluid past the motor, said instrumentality including a single valve subjected to the pressures of both fluids and actuated by the second fluid to interrupt such by-passing when the pressure of the first fluid drops below a preassigned pressure.

4. In combination with a fluid pressure operated motor, means continuously delivering a first fluid under pressure adapted to operate the motor in one direction; means maintaining a second fluid under substantially constant and less pressure than the first fluid, said second fluid permanently tending to operate the motor in the opposite direction; means for admitting the first fluid to and intercepting the same from the motor; and an instrumentality including a single valve subjected to the pressures of both fluids and actuated by the first fluid to by-pass the same past the motor when its pressure exceeds a preassigned value.

5. In combination with a fluid pressure operated motor, means continuously delivering a first fluid under pressure adapted to operate the motor in one direction; means maintaining a second fluid under substantially constant and less pressure than the first fluid, said second fluid permanently tending to operate the motor in the opposite direction; means for admitting the first fluid to and intercepting the same from the motor; and an instrumentality including a single valve subjected to both fluids and actuated by the first fluid to by-pass the same past the motor when its pressure exceeds a preassigned value, and actuated by the second fluid to interrupt such by-passing when the pressure of said first fluid drops below said preassigned value.

6. In combination with a fluid pressure operated motor, means maintaining a first fluid under substantially constant pressure, said fluid permanently tending to operate the motor in one direction; means continuously delivering a second fluid under higher pressure than the first fluid, said second fluid being adapted to operate the motor in the opposite direction; means for admitting the second fluid to and intercepting the same from the motor; and an instrumentality including a valve body in communication with the second fluid and a valve therein, one end face of said valve being exposed to the first fluid and the opposite end face thereof being exposed to the second fluid, these end faces being of such dimensions that the two fluids shift the valve into open position in which the pressure of the second fluid is relieved when the same exceeds a preassigned value, and shift the valve into closed position when the pressure of said second fluid drops below said preassigned value.

7. In combination with a fluid pressure operated motor, means maintaining a first fluid under substantially constant pressure, said fluid permanently tending to operate the motor in one direction; means continuously delivering a second fluid under higher pressure than the first fluid, said second fluid being adapted to operate the motor in the opposite direction; means for admitting the second fluid to and intercepting the same from the motor; and an instrumentality including a valve body in communication with the second fluid and a valve therein, one end face of said valve being exposed to the first fluid and the other end face thereof to the second fluid, the areas of these end faces being substantially inversely proportional to preassigned pressures of the two fluids whereby the valve is shifted into open position in which the pressure of the second fluid is relieved when the same exceeds a preassigned value, and is shifted into closed position when the pressure of said second fluid drops below said preassigned value.

8. In combination with a cylinder and a piston therein, means supplying high pressure fluid adapted to move the piston in one direction; a source of low pressure fluid permanently tending to move the piston in the opposite direction; means for admitting high pressure fluid to the cylinder and for simultaneously intercepting the high pressure fluid from the cylinder and venting the high pressure side thereof; an instrumentality including a single valve actuated by both fluids for maintaining a substantially constant ratio between the pressures of both fluids; and means for varying the pressure of one of the fluids at will.

LEO C. SHIPPY.
JOHN Q. HOLMES.